Figure 1:
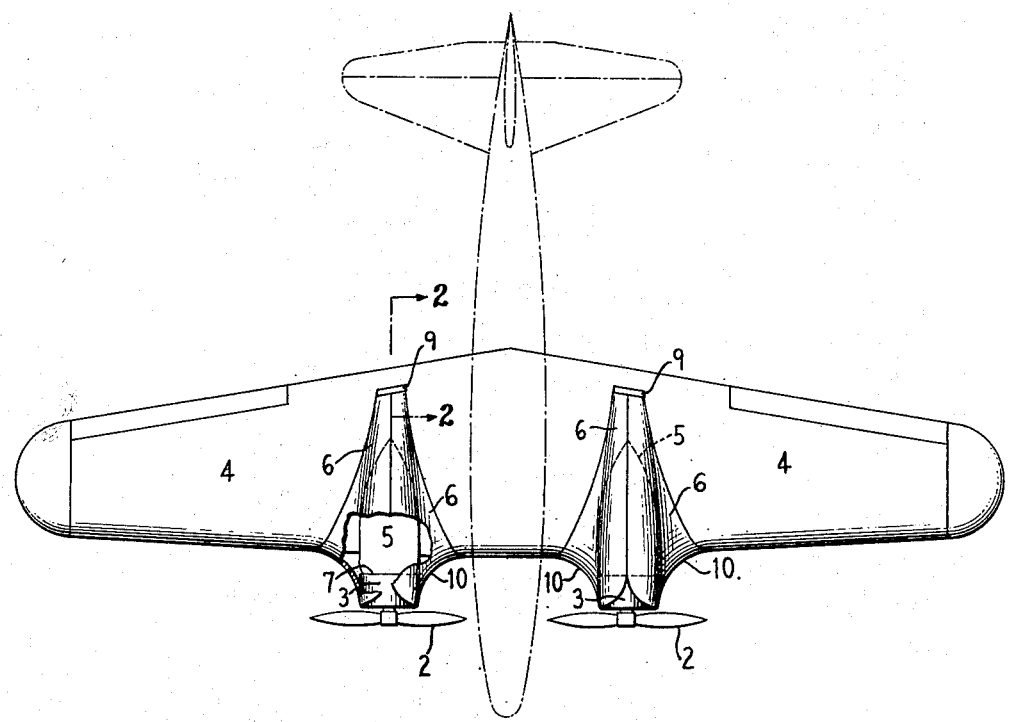

July 21, 1936.    G. LOENING    2,048,399

AIRPLANE

Filed March 18, 1936

INVENTOR
BY Grover Loening
ATTORNEY

Patented July 21, 1936

2,048,399

UNITED STATES PATENT OFFICE 2,048,399

AIRPLANE

Grover Loening, Mill Neck, N. Y., assignor to Grover Loening Aircraft Company, Inc., Garden City, N. Y., a corporation of New York Application March 18, 1936, Serial No. 69,441

4 Claims. (Cl. 244—31)

This invention relates to airplanes, including flying boats, amphibians, and water-skimming craft, having wings and air-cooled engines at the front of the wings.

An object of the invention is to keep the exhaust of the engine cooling air from impairing the lift. Other objects are to reduce parasite resistance, to increase lift, and to improve the control of the cooling air.

In general practice up to the present time, radial air-cooled engines are fitted with so-called "ring cowling"—a round enclosure of sheet metal which permits air to enter at the center of the propeller and exhausts this air through an annular slot back of the cowl piece. The exhaust of the air, however, is such as to pass mostly over the leading edge, high lifting portion of the wing, which results in reducing the effect of decreased pressure over the top of the wing. Furthermore, the round cylindrical projection of the cowled engine in front of the wing disturbs the air flow over the leading edge and in addition causes an abrupt pocket where the leading edge meets the cylindrical engine nacelle, thus adding to parasite drag.

The flow of air, however, that is induced to pass through the engine by means of the ring cowl and the annular opening at its rear is more or less satisfactory and need not be departed from.

According to one feature of the invention, an exterior covering is added to, or substituted for the cowling of this engine, this covering being so shaped as to form a fillet between the front of the engine and the leading edge of the wing, said fillet being of a section similar in shape to the leading edge of the wing, thus giving some lifting force while at the same time filling in the corner between the engine and the wing so as to reduce parasite drag, and improving the shape of the engine nacelle back of the leading edge to still further reduce drag.

This outer cover, however, is to be so much larger than the customary cowl in the region of the rear annular opening that the air coming out of this slot is exhausted inside of and underneath this outer cover and is carried back by suitable enclosed air passages to exhaust at the rear of the wing away from the region of high negative pressure, at which remote region a shutter is located to regulate the flow of air through the system. In this way no air vents out into the low pressure region above the leading edge of the wing and the form of the entire engine covering unit is such as to decrease parasite drag and increase lift.

While the forming of this outer cover to the engine nacelle may be external to and conveniently added to the existing ring cowl, annular exhaust slot, and rear form of the present customary engine nacelle, it is obvious that even greater improvement in air flow for cooling may be possible by modifying the detail design of the interior air passage.

Figure 2:
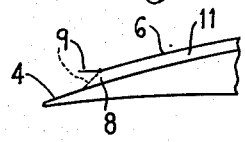

In the accompanying drawing forming part hereof:

Fig. 1 is a top plan of a plane embodying the invention, a fuselage and empennage forming no part of the invention being indicated by broken lines, and a portion of one of the coverings of the invention being broken away; and Fig. 2 is a section taken on the line 2—2 of Fig. 1.

Propellers 2 are driven by radial engines, not shown but represented by the ring cowls 3 which ordinarily surround the engines. Each engine is directly in front of the wing 4. The customary engine nacelles 5 are shown, but it will be understood that with this invention the nacelle form may be modified.

External covers 6 are applied to the cowls and over the nacelles, or over these regions, so that the exhaust engine cooling air, which ordinarily escapes from an annular slot at 7 at the rear edge of a ring cowl, is prevented from passing over the upper surface of the aerofoil at the forward region of reduced pressure. Instead the exhaust cooling air is conducted through a passage or passages 11 under the covering to the rear portion of the wing, where it escapes through a slot 8 regulated by a simple shutter 9 controlled by the pilot. Connections for moving the shutters need not be shown since operating arrangements are well known in airplane design.

At the front, the external covering is given a form which fills in the corners between the engines and the leading edge of the wings with fillets 10 of section similar to the section of the leading edge of a wing. The slot 7 behind the engine, or at least the upper part of it, is enclosed or covered. The parts of the covering 6 extending rearward on the upper surface of the wing are shaped to minimize drag.

It will be obvious that the covering 6 may be built in as part of the wing covering, also that the ring cowls may be part of the coverings. The coverings need not extend beneath the wing, since the exhausting of cooling air under the leading edge of the wing does not have the detrimental effect of exhausting it over the leading edge.

Features of the invention are the exhausting of the engine cooling air at the rear of the wing, where no lift is spoiled; the combination of air passage and cowl forms providing a leading-edge, wing-shape fillet; the providing of a simple shutter to control engine cooling, in place of the complicated leaves necessary to vary the size of opening for cooling around the customary annular air exhaust back of the wing cowl; and the conducting of ring-cowl air flow inside a smooth external covering forming outer walls for a controlled air passage. The nearer the leading edge of the wing is to the annular opening at the rear of the engine ring cowl, the more advantageous this system becomes. If the engine is carried very far out in front of the wing it becomes less practical to use the type of cowling of this invention.

I claim:

1. In an airplane, a wing, an air-cooled engine directly in front of the wing, and a covering applied over the engine and the wing and constructed to conduct exhaust cooling air to an exhaust opening toward the rear of the wing.

2. In an airplane, a wing, an air-cooled engine directly in front of the wing, and a covering applied over the engine and forming a fillet joining the covering of the wing and conforming with the leading edge of the wing.

3. In an airplane, a wing, an air-cooled engine directly in front of the wing, and a smooth external covering applied over the engine and wing and forming fillets between the engine and the leading edge of the wing and enclosing passages which compel exhaust cooling air to pass to the rear of the wing before it is exhausted.

4. In an airplane, a wing, an air-cooled engine directly in front of the wing, a covering applied over the engine and the wing and constructed to conduct exhaust cooling air to an exhaust opening toward the rear of the wing, and a shutter controlling the exhaust air passage enclosed by said covering.

GROVER LOENING.